United States Patent
Takeda

(10) Patent No.: US 9,959,212 B2
(45) Date of Patent: May 1, 2018

(54) MEMORY SYSTEM

(71) Applicant: KABUSHIKI KAISHA TOSHIBA, Tokyo (JP)

(72) Inventor: Susumu Takeda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 15/067,658

(22) Filed: Mar. 11, 2016

(65) Prior Publication Data

US 2016/0267008 A1    Sep. 15, 2016

(30) Foreign Application Priority Data

Mar. 13, 2015    (JP) .................. 2015-051379

(51) Int. Cl.
*G06F 12/00* (2006.01)
*G06F 12/0893* (2016.01)
*G06F 12/02* (2006.01)

(52) U.S. Cl.
CPC ...... *G06F 12/0893* (2013.01); *G06F 12/0246* (2013.01); *G06F 2212/6012* (2013.01); *Y02B 60/1225* (2013.01)

(58) Field of Classification Search
None
See application file for complete search history.

(56) References Cited

U.S. PATENT DOCUMENTS

| 5,983,023 | A | 11/1999 | Moriwaki et al. |
| 8,615,637 | B2 | 12/2013 | Rogers et al. |
| 2011/0145479 | A1* | 6/2011 | Talagala .................. G06F 12/02 711/103 |
| 2011/0161555 | A1* | 6/2011 | Olds .................... G06F 12/0866 711/103 |
| 2014/0047184 | A1* | 2/2014 | Kang .................. G06F 12/0893 711/122 |
| 2014/0304473 | A1 | 10/2014 | Zachariassen et al. |
| 2015/0161052 | A1* | 6/2015 | Seong ................. G06F 12/0895 711/128 |

(Continued)

FOREIGN PATENT DOCUMENTS

| JP | 10-207769 | 8/1998 |
| JP | 2010-198129 | 9/2010 |
| JP | 2013-504822 | 2/2013 |

(Continued)

OTHER PUBLICATIONS

Sun, G., et al., "A Novel Architecture of the 3D Stacked MRAM L2 Cache for CMPs", IEEE (2008), pp. 239-249.

(Continued)

*Primary Examiner* — Daniel D Tsui
(74) *Attorney, Agent, or Firm* — Finnegan, Henderson, Farabow, Garrett & Dunner, L.L.P.

(57) ABSTRACT

A memory system has a first cache memory comprising a volatile memory, a second cache memory comprising a non-volatile memory with access speed slower than access speed of the volatile memory, and a reconfiguration control circuitry to switch between a first mode that uses the second cache memory as a cache memory in a lower layer than the first cache memory and a second mode that uses the first cache memory and the second cache memory as cache memories in an identical memory layer.

20 Claims, 10 Drawing Sheets

(56) References Cited

U.S. PATENT DOCUMENTS

2015/0332750 A1* 11/2015 Dong .................. H01L 43/12
                                                    365/158

FOREIGN PATENT DOCUMENTS

| JP | 2013-536515 | 9/2013 |
| WO | WO 2011/031969 A1 | 3/2011 |
| WO | WO 2012/024801 A1 | 3/2012 |

OTHER PUBLICATIONS

Chen, Y., et al., "Static and Dynamic Co-Optimizations for Blocks Mapping in Hybrid Caches", ISLPED (2012), 6 pages.

* cited by examiner

MEMORY SYSTEM

CROSS REFERENCE TO RELATED APPLICATIONS

This application is based upon and claims the benefit of priority from the prior Japanese Patent Application No. 2015-51379, filed on Mar. 13, 2015, the entire contents of which are incorporated herein by reference.

FIELD

An embodiment according to the present invention relates to a memory system including a cache memory.

BACKGROUND

As called a memory wall problem, a time period required for memory access and electric power consumption act as major factors hindering the performance enhancement of an arithmetic core.

As a remedy for this problem, a countermeasure is taken to, for example, make a capacity of a cache memory with a higher speed than that of a main memory larger. In the past, a static RAM (SRAM) with a higher speed than that of a dynamic random access memory (DRAM) used as the main memory has been often employed as the cache memory. However, it is more difficult to achieve high integration in the SRAM than the case of the DRAM. Moreover, cost of the SRAM is high. Accordingly, making the capacity of the cache memory larger leads to a problem such as an increase in a circuit area and a rise in the cost.

A next generation memory other than the SRAM is also researched as the cache memory. For example, a magnetoresistive RAM (MRAM) with a higher speed than that of the DRAM is also researched as the cache memory. The MRAM is a non-volatile memory where the high integration can be achieved relatively with ease. Additionally, leakage electric power is low in the MRAM and thus electric power saving can be realized. However, the MRAM is considered to be inferior to the SRAM from a viewpoint of access speed because the MRAM has a slower speed than that of the SRAM particularly during writing.

DETAILED DESCRIPTION

According to one embodiment, a memory system has a first cache memory comprising a volatile memory, a second cache memory comprising a non-volatile memory with access speed slower than access speed of the volatile memory, and a reconfiguration control circuitry to switch between a first mode that uses the second cache memory as a cache memory in a lower layer than the first cache memory and a second mode that uses the first cache memory and the second cache memory as cache memories in an identical memory layer.

Hereinafter, an embodiment according to the invention will be described with reference to the drawings. The following description of the embodiment will focus on a characteristic configuration and operation within a memory system. Therefore, the memory system can include a configuration and operation omitted in the following description. Note that these omitted configuration and operation are also included in the scope of the embodiment.

Figure 1:
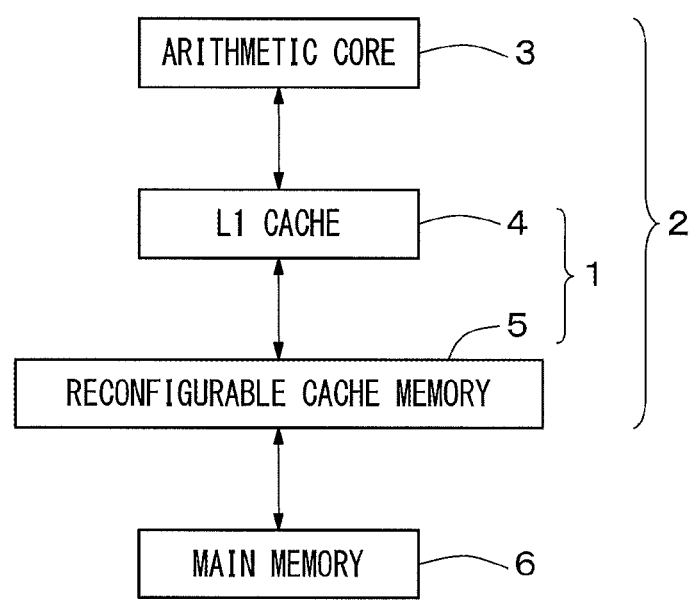
FIG. 1 is a block diagram illustrating a schematic configuration of a processor system 2 including a memory system 1 according to an embodiment.

FIG. 1 is a block diagram illustrating a schematic configuration of a processor system 2 including a memory system 1 according to the embodiment. The processor system 2 in FIG. 1 includes an arithmetic core 3 and a memory system 1. The memory system 1 includes an L1 cache 4 and a reconfigurable cache memory 5. A main memory 6 serving as a memory at the lowermost layer is connected to the memory system 1. The main memory 6 may be included in the memory system 1. However, the present specification will describe an example where the main memory 6 is provided at the outside of the memory system 1.

The arithmetic core 3 may have a multi-core configuration including a plurality of core units, or alternatively, a single-core configuration. The arithmetic core 3 is connected to the L1 cache 4. The arithmetic core 3 reads data or commands used for arithmetic from the L1 cache 4 and stores arithmetic result data to the L1 cache 4.

The L1 cache 4 is a cache memory at the uppermost layer and configured by using, for example, an SRAM since high-speed access performance is required.

The reconfigurable cache memory 5 is a cache memory at a lower layer than the L1 cache 4. In the present specification, the lower layer means that an access priority of the processor is lower. For example, the L2 cache memory is a lower layer memory than the L1 cache 4.

In the example in FIG. 1, in a case where data requested by the arithmetic core 3 is not stored within the L1 cache 4, the reconfigurable cache memory 5 is accessed. The term "reconfigurable" means that various types of configurations can be switched in the cache memory.

As will be described later, the reconfigurable cache memory 5 includes a plurality of cache memories and can be switched between a mode for using this plurality of cache memories as cache memories at different layers from each other (first mode) and a mode for using this plurality of cache memories as separate cache memories having different access speed from each other (second mode) in the same layer.

The present specification will describe an example where the reconfigurable cache memory 5 has two cache memories. However, the number of the cache memories included within the reconfigurable cache memory 5 can be arbitrarily determined as long as two or more cache memories are used. For example, in a case where three cache memories are included within the reconfigurable cache memory 5, the first mode uses these three cache memories as cache memories at different layers from each other, whereas the second mode uses these three cache memories as separate cache memories having different access speed from each other in the same layer. For simpler description, the present specification will describe an example where two cache memories are included within the reconfigurable cache memory 5 in which the first mode and the second mode are switchable.

The main memory 6 is configured by using a DRAM, for example. In a case where data requested by the arithmetic core 3 is not stored in the L1 cache 4, a search is performed to confirm whether this data is stored in the reconfigurable cache memory 5.

When this data is not stored in the reconfigurable cache memory 5, the main memory 6 is accessed.

Figure 2:
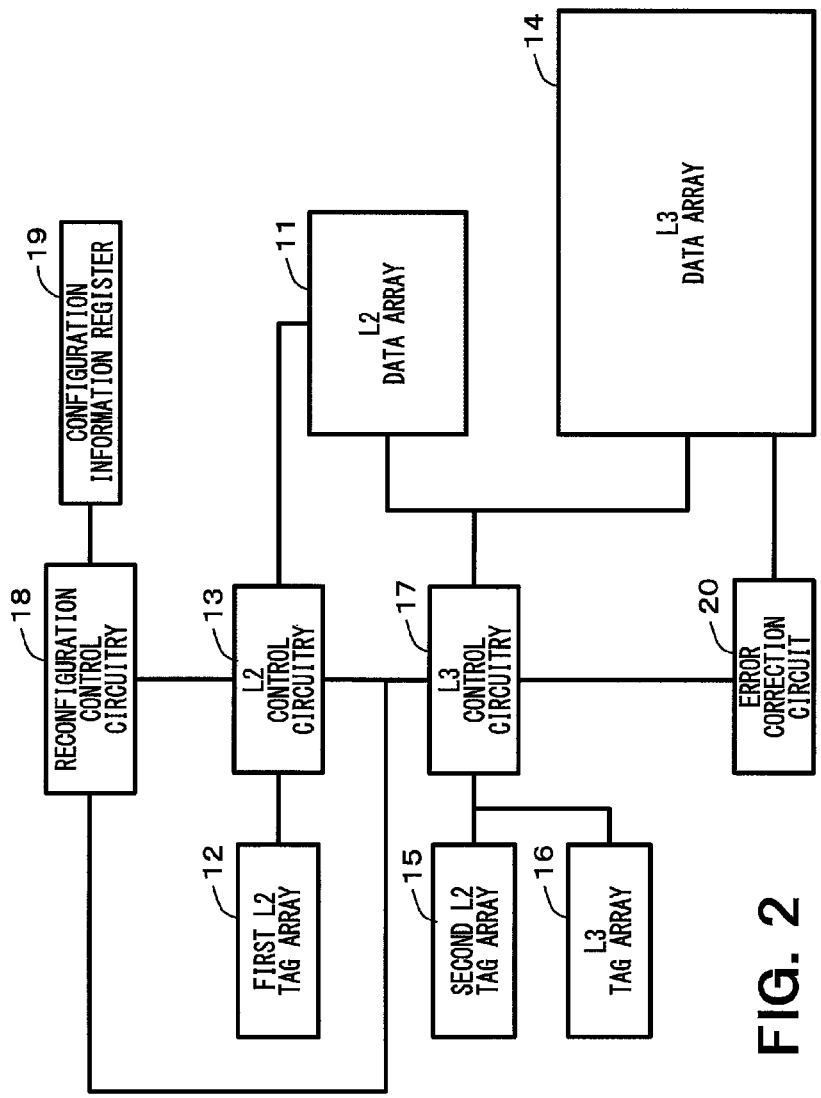
FIG. 2 is a block diagram illustrating an exemplary internal configuration of a reconfigurable cache memory 5.

FIG. 2 is a block diagram illustrating an exemplary internal configuration of the reconfigurable cache memory 5. The reconfigurable cache memory 5 in FIG. 2 includes an L2 data array (first cache memory, first cache data circuitry) 11, a first L2 tag array (first tag circuitry) 12, an L2 controller (first control circuitry) 13, an L3 data array (second cache memory, second cache data circuitry) 14, a second L2 tag array (second tag circuitry) 15, an L3 tag array 16, an L3 controller (second control circuitry) 17, a reconfiguration controller (reconfiguration control circuitry) 18, a configuration information register (switching information storage) 19, and an error correction circuit (error correction circuitry) 20.

Here, the reconfigurable cache memory 5 is not necessarily limited to being applied to cache memories at an L2 layer and an L3 layer. For example, the L1 cache 4 to an L2 cache are configured as layered memories similar to existing cache memories, and an L3 cache and an L4 cache may be replaced with the reconfigurable cache memory 5. For simpler description, an example where the reconfigurable cache memory 5 has the configuration as illustrated in FIG. 2 will be described hereinafter.

The L2 data array 11 is a volatile memory storing data requested by the arithmetic core 3, whereas the first L2 tag array 12 is a volatile memory storing address information of data within the L2 data array 11 during the first mode. In a more specific example, both of the L2 data array 11 and the first L2 tag array 12 are configured by using the SRAMs.

As will be described later, the L2 controller 13 controls access to the L2 data array 11 depending on a mode switched by the reconfiguration controller 18. More specifically, the L2 controller 13 accesses the L2 data array 11 by assuming the L2 data array 11 as an L2 cache memory at a lower layer than the L1 cache 4 during the first mode. In this case, the L2 controller 13 accesses the L2 data array 11 in units of cache lines. On the other hand, the L2 controller 13 stops to access the L2 data array 11 during the second mode. As described above, the L2 controller 13 and the first L2 tag array 12 may not be used during the second mode.

The L3 data array 14 is a non-volatile memory storing data requested by the arithmetic core 3. The second L2 tag array 15 is not used during the first mode described later, while acting as a volatile memory storing address information of data within the L2 data array 11 during the second mode. The L3 tag array 16 is a volatile memory storing address information of data within the L3 data array 14. In a more specific example, the L3 data array 14 is configured by using an MRAM, whereas the second L2 tag array 15 and the L3 tag array 16 are configured by using the SRAMs. The reason why the L3 tag array 16 is configured by the SRAM is that hit/miss determination needs to be completed as quickly as possible to determine whether data requested by the arithmetic core 3 is stored within the L3 data array 14. In addition, a memory capacity of the L3 tag array 16 is smaller than that of the L3 data array 14. Thus, even when the SRAM is used, a problem such as an increase in a circuit area or an increase in the cost does not occur. The L3 tag array 16 may be configured by a non-volatile memory such as the MRAM depending on the necessity.

The L3 data array 14 and the L3 tag array 16 function as an L3 cache memory during the first mode. Meanwhile, the L2 data array 11 and the L3 data array 14 function during the second mode as a hybrid memory in which the data arrays have different access speed from each other in the same layer.

The error correction circuit 20 carries out error correction processing on data read from the L3 data array 14 to supply data whose error has been corrected to the L3 controller 17. The reason why the error correction circuit 20 is required is that, when the MRAM is used as the L3 data array 14, a bit error occurs more frequently than the case of the SRAM. When data requested by the arithmetic core 3 is read from the L3 data array 14, data whose error has been corrected by the error correction circuit 20 is supplied to the arithmetic core 3, or the L1 cache 4 and the L2 data array 11. Accordingly, data reliability is not reduced even in the case of the data read from the MRAM.

The reconfiguration controller 18 switches between the first mode for using the L2 data array 11 as a cache memory at a lower layer than the L1 cache 4 and the second mode for using the L2 data array 11 and the L3 data array 14 as separate cache memories having different access speed from each other in the same layer.

As will be described later, the reconfiguration controller 18 switches between the first mode and the second mode based on access frequency information on the L2 data array 11 and the L3 data array 14. The reconfiguration controller 18 stores, to the configuration information register 19, information on a mode to be switched to. This configuration information register 19 may be provided in the inside of the reconfiguration controller 18.

An L2 data register (not illustrated) is provided in the inside of the L2 controller 13. Likewise, an L3 data register (not illustrated) is provided in the inside of the L3 controller 17. The reconfiguration controller 18 communicates mode information set in the configuration information register 19 to the L2 controller 13 and the L3 controller 17. Subsequently, the L2 controller 13 stores the mode information to the L2 data register, whereas the L3 controller 17 stores the mode information to the L3 data register. A configuration having the configuration information register 19 in FIG. 2, the L2 data register, and the L3 data register is an example. For example, only the configuration information register 19 may be maintained such that the L2 controller and the L3 controller refer to the configuration information register 19.

The L2 controller 13 determines which of the first mode and the second mode is used based on the mode information within the L2 data register to control access to the L2 data array 11. Likewise, the L3 controller 17 determines which of the first mode and the second mode is used based on the mode information within the L3 data register to control access to the L2 data array 11 and the L3 data array 14.

(Mode Transition)

Figure 3:
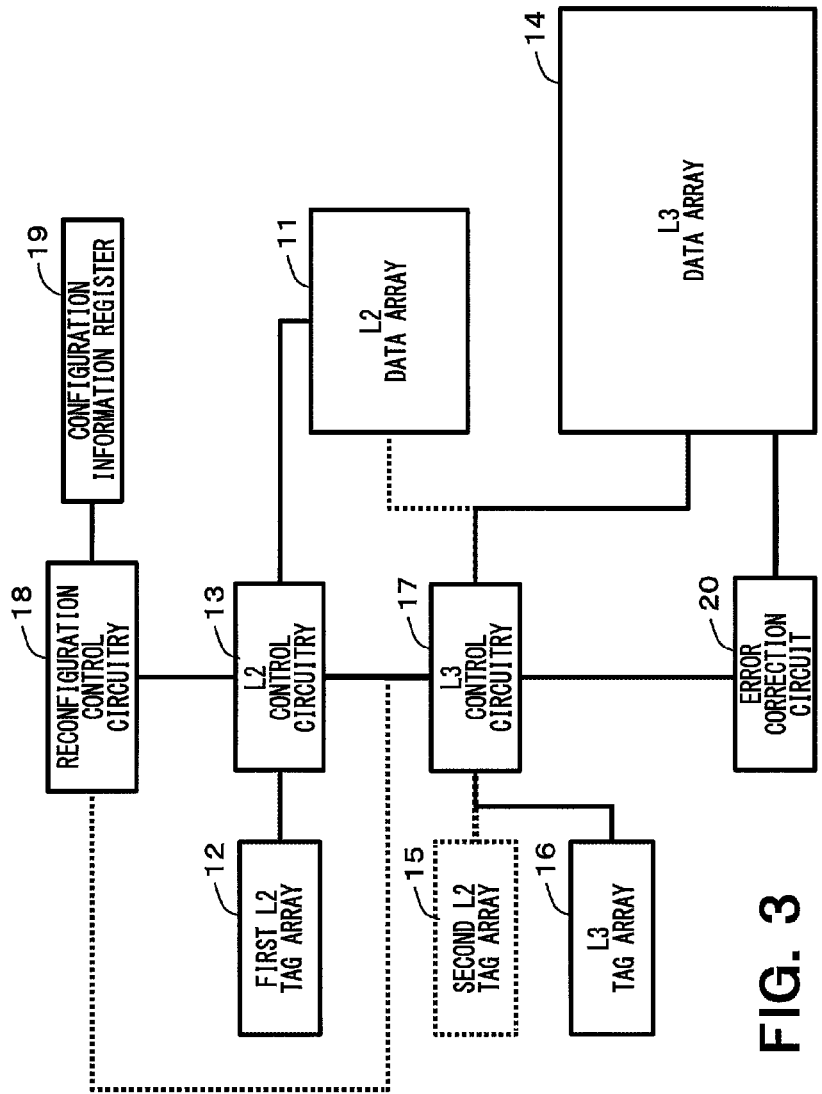
FIG. 3 is a block diagram illustrating the reconfigurable cache memory 5 reconfigured to a first mode from a second mode.

FIG. 3 is a block diagram illustrating the reconfigurable cache memory 5 reconfigured to the first mode from the second mode. Dashed line portions in FIG. 3 indicate not to be used during the first mode.

Once the reconfiguration controller 18 determines to reconfigure to the first mode from the second mode based on access frequencies of the L2 data array 11 and the L3 data array 14, the reconfiguration controller 18 writes the mode information on the first mode (for example, 1) to the configuration information register 19 while communicating this mode information to the L2 controller 13 and the L3 controller 17. Upon receiving this communication, the L2 controller 13 writes the mode information on the first mode (for example, 1) to the L2 data register. Likewise, the L3 controller 17 writes similar mode information to the L3 data register.

When the second mode is switched to the first mode, data stored in the L2 data array 11 until that time point is disabled. Accordingly, the L2 controller 13 carries out initialization processing on the L2 data array 11. During this initialization processing, it is considered to carry out, for example, write back processing for writing information existing only in the L2 data array 11 (data that has been written) back to a lower layer, and processing for writing zero to all memory regions within the first L2 tag array 12 as well. In other words, the L2 controller 13 carries out processing for setting all memory regions in the L2 data array 11 and the first L2 tag array 12 to zero.

Note that data stored in the L3 data array 14 is held as it is. By holding the data within the L3 data array 14 as it is, even immediately after the second mode has been switched to the first mode, data requested by the arithmetic core 3 can be acquired from the L3 data array 14.

During the first mode, the L2 data array 11 and the L3 data array 14 are individually used as memories at different layers from each other (as an L2 cache memory and an L3 cache memory). More specifically, the L2 data array 11 is accessed in a case where data requested by the arithmetic core 3 is not present within the L1 cache 4, that is, in a case where a cache miss occurs in the L1 cache 4. Upon receiving a read request from the arithmetic core 3 through the L1 cache 4, the L2 controller 13 checks whether an address required by that read request has a hit in address information within the first L2 tag array 12. In the case of a hit, the L2 controller 13 accesses the L2 data array 11. The L2 controller 13 transfers data read from the L2 data array 11 to the L1 cache 4, while transferring the same data to the arithmetic core 3 as well.

The L3 data array 14 is accessed in a case where data requested by the arithmetic core 3 is not present in the L1 cache 4 or the L2 data array 11. Upon receiving a read request from the arithmetic core 3 through the L2 controller 13, the L3 controller 17 checks whether an address required by that read request has a hit in address information within the L3 tag array 16. In the case of a hit, the L3 controller 17 accesses the L3 data array 14. The L3 controller 17 transfers data read from the L3 data array 14 to the L1 cache 4 and the L2 data array 11, while transferring the same data to the arithmetic core 3 as well.

As described above, the L1 cache 4, the L2 data array 11 (L2 cache memory), and the L3 data array 14 (L3 cache memory) function as layered cache memories during the first mode. For example, all data stored in the L1 cache 4 is stored to the L2 data array 11, all data stored in the L2 data array 11 is stored to the L3 data array 14, and all data stored in the L3 data array 14 is stored to the main memory 6.

Typically, the L2 data array 11 requires a memory capacity equal to or larger than that of the L1 cache 4. In addition, the L3 data array 14 requires a memory capacity equal to or larger than that of the L2 data array 11. Access units of amounts of data written to/read from the L1 cache 4 and the L2 data array 11 may be the same (for example, in units of cache lines of 64 bytes), or alternatively, different from each other. For example, the L1 cache 4 and the L2 data array 11 may be accessed in units of cache lines of 64 bytes, while the L3 data array 14 may be accessed in units of cache lines of 128 bytes. In any cases, the L2 data array 11 and the L3 data array 14 are accessed in units of cache lines during the first mode.

Figure 4:
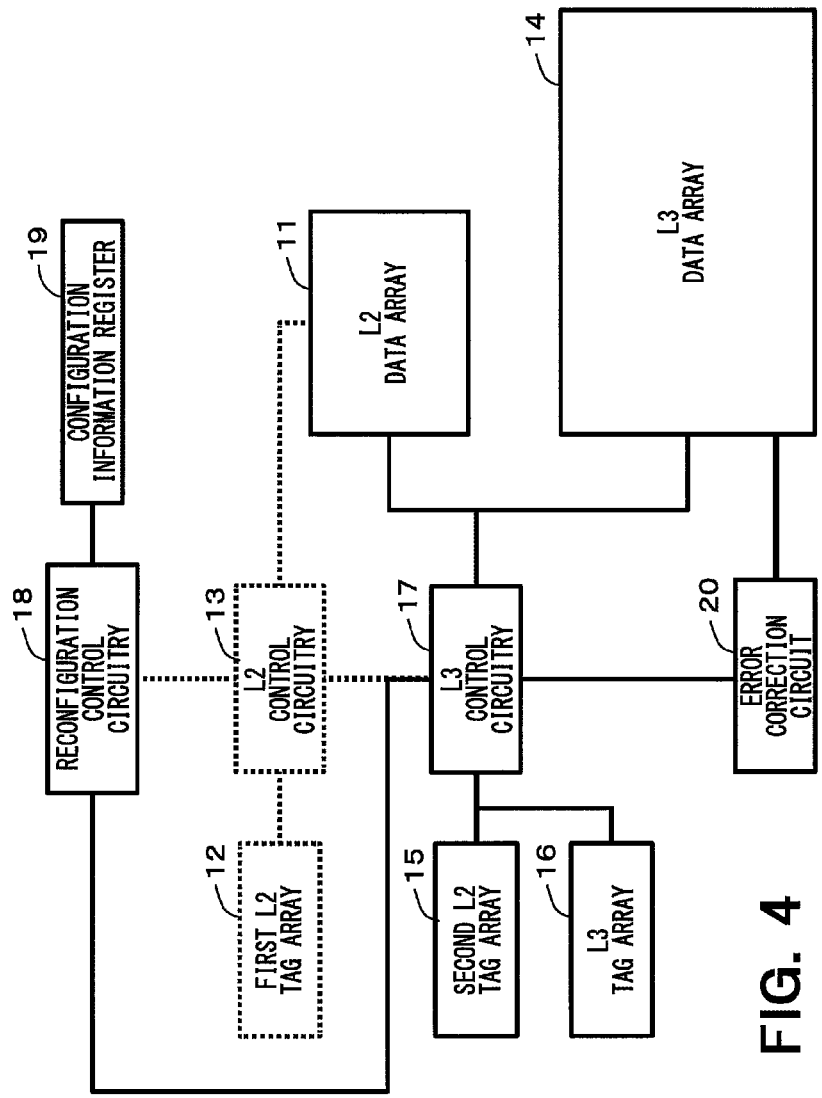
FIG. 4 is a block diagram illustrating the reconfigurable cache memory 5 reconfigured to the second mode from the first mode.

FIG. 4 is a block diagram illustrating the reconfigurable cache memory 5 reconfigured to the second mode from the first mode. Dashed line portions in FIG. 4 indicate not to be used during the second mode.

Once the reconfiguration controller 18 determines to reconfigure to the second mode from the first mode, the reconfiguration controller 18 writes the mode information on the second mode (for example, 0) to the configuration information register 19 while communicating this mode information to the L2 controller 13 and the L3 controller 17. Upon receiving this communication, the L2 controller 13 writes the mode information on the second mode (for example, 0) to the L2 data register. Likewise, the L3 controller 17 writes similar mode information to the L3 data register.

When the first mode is switched to the second mode, data stored in the L2 data array 11 until that time point is disabled. Accordingly, the L2 controller 13 carries out initialization processing on the L2 data array 11 and the first L2 tag array 12.

However, data stored in the L3 data array 14 is held as it is. As a result, immediately after the first mode has been switched to the second mode, data cannot be read from the L2 data array 11 at a high speed in accordance with a read request from the arithmetic core 3. However, the L3 data array 14 stores data requested by the arithmetic core 3 therein. By storing data requested by the arithmetic core 3 in the L3 data array 14, higher speed reading can be obtained than the case of accessing the main memory 6. As described above, information within the L3 data array 14 is not initialized, whereby a decrease in memory access performance when the first mode is reconfigured to the second mode can be suppressed.

During the second mode, the L2 data array 11 and the L3 data array 14 are used as memories at the same layer in a simulated manner. As will be described later, by storing, in the L2 data array 11, word data inside a cache line having a higher access frequency, data having a higher access frequency can be accessed at a higher speed.

The reconfiguration controller 18 may communicates switching between the first mode and the second mode to the L2 controller 13 and the L3 controller 17 at any timing. For example, switching of the mode information may be communicated thereto in accordance with a timing at which the reconfiguration controller 18 overwrites the mode information on the configuration information register 19, or alternatively, a timing at which the reconfiguration controller 18 transmits an access request from the arithmetic core 3 to the L2 controller 13 and the L3 controller 17 after overwriting the mode information on the configuration information register 19.

(Data Structure of Hybrid Memory)

Figure 5:
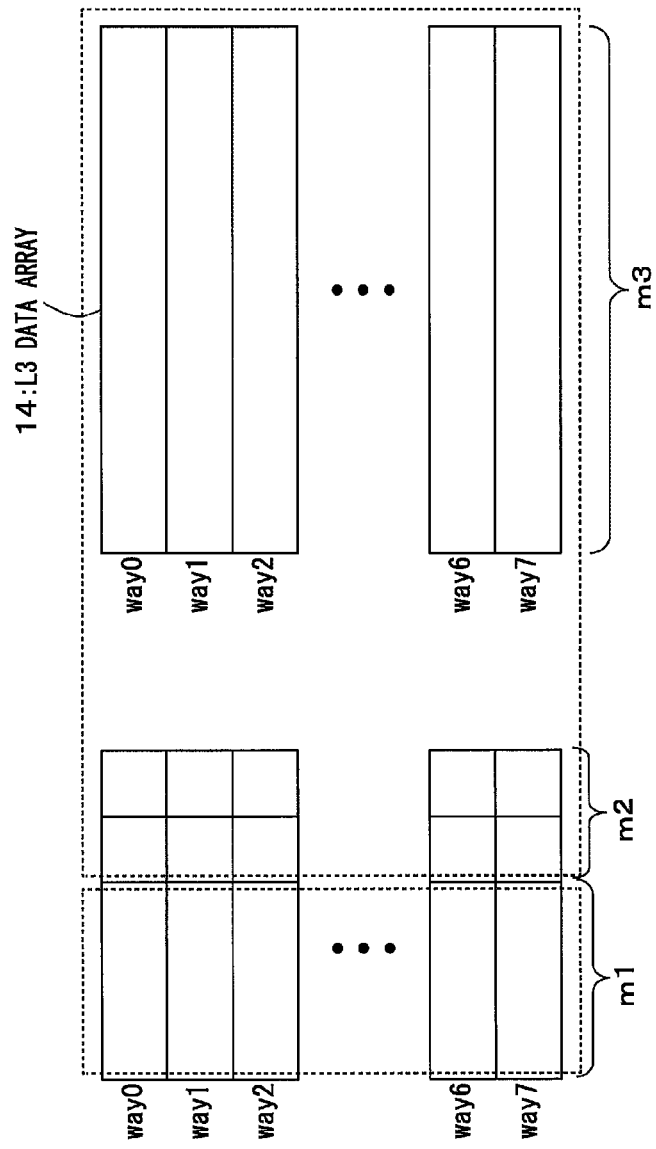
FIG. 5 is a diagram illustrating a first example of a data structure of a hybrid memory.

During the second mode, the L3 controller 17 uses the L2 data array 11 and the L3 data array 14 as cache memories at the same layer, namely, the hybrid memory. FIG. 5 is a diagram illustrating a first example of a data structure of the hybrid memory. The hybrid memory in FIG. 5 includes three memory regions m1, m2, and m3. The memory region m1 is a tag region configured by the L3 tag array 16. The memory region m2 is a word data storage region configured by the L2 data array 11. The memory region m3 is a cache line data storage region configured by the L3 data array 14.

The memory regions m1 and m2 are configured by using high-speed volatile memories such as the SRAMs and can be accessed at a high speed. The memory region m3 is configured by using the non-volatile memory such as the MRAM. Compared to the memory regions m1 and m2, the access speed is low but the memory capacity is large.

The hybrid memory in FIG. 5 is divided into a plurality of ways way0 to way7 and each way is accessed in units of cache lines. The number of ways is not limited to eight. In addition, dividing the data arrays into the plurality ways is not necessarily required.

The L2 data array 11 corresponding to the memory region m2 can be accessed at a higher speed than the case of the L3 data array 14 corresponding to the memory region m3. Accordingly, it is desirable to store, in the memory region m2, word data having a high frequency of being referred to first by the arithmetic core, namely, a critical word, among word data inside each of the cache lines within the L3 data array 14. FIG. 5 illustrates an example of providing the memory region m2 capable of storing two critical words in each way. However, the memory capacity of the memory region m2 is not particularly limited.

By providing the hybrid memory as illustrated in FIG. 5, it is possible to suppress a decrease in performance due to a slower access speed and higher electric power consumption which are disadvantages of the non-volatile memory such as the MRAM. For example, when word data inside each of the cache lines having a high frequency of being accessed first is stored in the memory region m2, average access speed can be enhanced while the electric power consumption can be suppressed.

Figure 6:
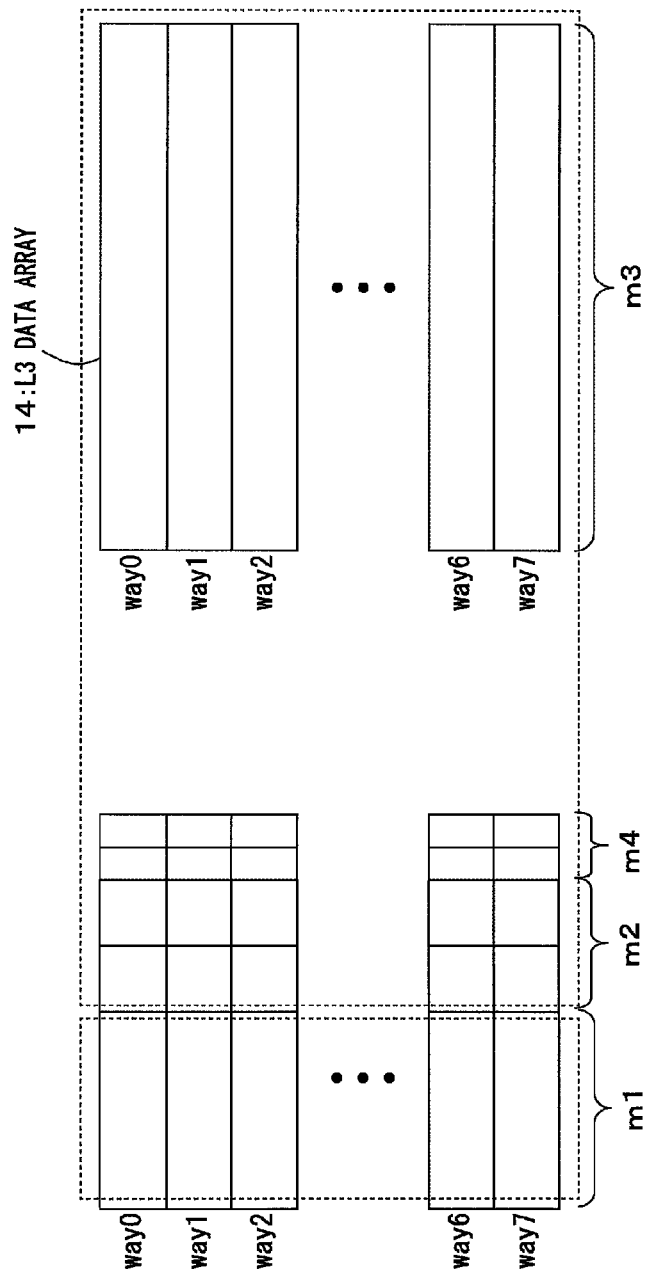
FIG. 6 is a diagram illustrating a second example of the data structure of the hybrid memory.

FIG. 6 is a diagram illustrating a second example of the data structure of the hybrid memory. The hybrid memory in FIG. 6 includes a memory region m4 in addition to the memory regions m1 to m3 in FIG. 5. The memory region m4 is a tag region storing address information of the word data in the memory region m2. The second L2 tag array 15 in FIG. 2 is used for the memory region m4.

Assuming that one piece of word data is eight bytes and one cache line is 64 bytes, eight words are stored inside the one cache line.

When the address information is stored in the memory region m4, at least three bits are required to identify which word data inside one cache line is stored to the memory region m2.

Therefore, the memory region m4 at least requires a memory capacity of an amount obtained by multiplying three bits by the number of pieces of word data stored in the L2 data array 11. When a word at a position succeeding to a certain number of words from a top word in a line is stored in the memory region m4, three bits per one word are required to express the position among the eight words. When a bit vector is held in the memory region m4, one bit is associated with each of the eight words and thus eight bits are required. For a simple example, a top word in a line is associated with a first bit and a second word from the top word in the line is associated with a second bit. Additionally, for example, a bit associated with a word stored in the L2 data array 11 is defined as 1, whereas a bit associated with a word not stored therein is defined as 0.

(Reconfiguration Policy)

As a policy for reconfiguration by the reconfiguration controller 18, it is considered to select a cache configuration capable of obtaining a less memory latency. When the number of hits in the L2 data array 11 on each of reconfigurable cache configurations is found, an overhead on each of the cache configurations can be calculated using the following formulas (1) and (2).

$$\text{Overhead1} = \text{LatencySRAM} \times \text{HitCountSRAM} + \text{LatencyMRAM} \times \text{HitCountMRAM} \quad (1)$$

$$\text{Overhead2} = \text{LatencySRAM} \times \text{HitCountSRAM} + \text{LatencyMRAM} \times (\text{HitCountMRAM} - \text{HitCountSRAM}) \quad (2)$$

The formulas (1) and (2) represent an example where the L2 data array 11 is the SRAM and the L3 data array 14 is the MRAM. Overhead1 represents an overhead in the first mode, whereas Overhead2 represents an overhead in the second mode. Here, the overhead means a processing load of the arithmetic core 3 required to access the L2 data array 11 and the L3 data array 14. In addition, LatencySRAM represents a latency, namely, access speed of the L2 data array 11, LatencyMRAM represents a latency of the L3 data array 14, HitCountSRAM represents the number of accesses to the L2 data array 11, and HitCountMRAM represents the number of accesses to the L3 data array 14.

As indicated in the formula (1), the overhead in the first mode is a sum of a value obtained by multiplying the latency of the L2 data array 11 by the number of accesses thereto and a value obtained by multiplying the latency of the L3 data array 14 by the number of accesses thereto.

Meanwhile, as indicated in the formula (2), the overhead in the second mode is a sum of a value obtained by multiplying the latency of the L2 data array 11 by the number of accesses thereto and a value obtained by multiplying the latency of the L3 data array 14 by the number of accesses thereto. The number of accesses to the L3 data array 14 in the second mode is a value obtained by subtracting the number of accesses to the L2 data array 11 from the total number of accesses.

Based on the overheads in the respective cache configurations obtained using the formulas (1) and (2), the reconfiguration controller 18 selects a mode with a minimum overhead. More specifically, based on the flowchart illustrated in FIG. 7 or the like, the reconfiguration controller 18 selects the first mode or the second mode. As described above, mode selection can be controlled based on the number of accesses, namely, the access frequency information. In the embodiment, relatively accurate overheads have been calculated by using the latency information as well. However, simpler information may be used for the control. For example, the second mode may be selected when the number of accesses to the L3 data array 14 per unit time exceeds a threshold in the first mode, while the first mode may be selected when the number of accesses to the L3 data array 14 is lower than the threshold in the second mode.

First, the reconfiguration controller 18 acquires the latency LatencySRAM and the number of accesses HitCountSRAM of the L2 data array 11 and the latency LatencyMRAM and the number of accesses HitCountMRAM of the L3 data array 14 (step S1). For example, values of latencies defined by design specifications of the SRAM and MRAM can be applied to LatencySRAM and LatencyMRAM.

In addition, the number of hits measured by, for example, counters (not illustrated) provided in both of the L2 controller 13 and the L3 controller 17 can be applied to HitCountSRAM and HitCountMRAM. More specifically, in order to obtain Overhead1 in the formula (1), HitCountSRAM can be measured by the counter in the L2 controller 13, whereas HitCountMRAM can be measured by the counter in the L3 controller 17. Meanwhile, in order to obtain Overhead2 in the formula (2), both of Hit-CountSRAM and HitCountMRAM can be measured by the counter in the L3 controller 17.

Next, by using the latencies LatencySRAM and LatencyMRAM and the numbers of accesses HitCountSRAM and HitCountMRAM acquired in step S1, the reconfiguration controller 18 computes the overhead Overhead1 in the first mode and the overhead Overhead2 in the second mode using the formulas (1) and (2) (step S2).

Subsequently, the reconfiguration controller 18 compares the overheads Overhead1 and Overhead2 (step S3) to select a smaller one and selects a mode corresponding to the selected overhead (step S4). Thereafter, the reconfiguration controller 18 writes identification information on the selected mode (mode information) to the configuration information register 19.

Figure 7:
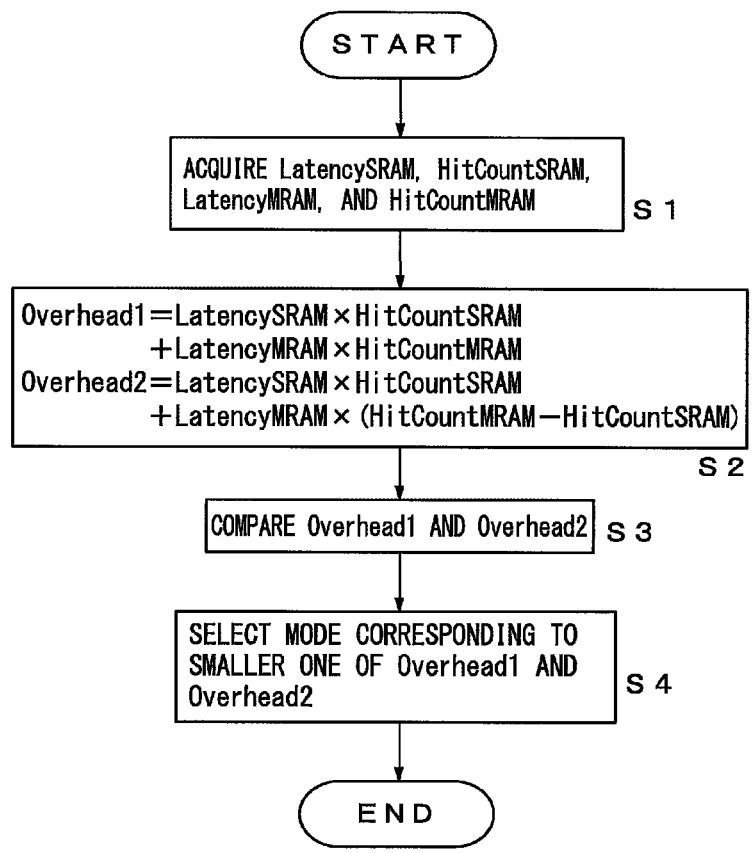
FIG. 7 is a flowchart illustrating an exemplary processing procedure of a reconfiguration controller.

Processing in FIG. 7 may be regularly or irregularly carried out while one mode is being selected. For example, while one mode is being selected, profiles for the respective reconfigurable cache configurations may be acquired to calculate the overheads in the respective cache configurations such that a configuration with a minimum overhead is dynamically switched to.

A method for acquiring the profiles in both of the first mode and the second mode to select a proper mode has a risk of an overhead generated by the profile acquisition time. For a solution to this, while a normal profile for the selected cache configuration is acquired, a profile for a cache configuration other than the selected cache configuration may be acquired by simulation.

For example, while the second mode is being selected, the number of accesses to the L2 data array 11 in the first mode may be obtained by simulation using the disabled first L2 tag array 12. In this case, by subtracting the number of accesses to the L2 data array 11 obtained by simulation from the number of accesses to the L3 data array 14 in the second mode, the number of accesses to the L2 data array 11 in the first mode can be also obtained. In addition, while the first mode is being selected, the number of accesses to the L2 data array 11 in the second mode may be obtained by simulation using the disabled second L2 tag array 15. During the first mode, the L3 controller 17 does not need to be accessed in the case of a cache hit in the L2 data array 11. However, for the purpose of the aforementioned simulation, address information of access data may be transmitted to the L3 controller 17 even in the case of a hit in the L2 data array 11 such that the number of accesses to the L2 data array 11 and the number of accesses to the L3 data array 14 in the second mode are simulated.

(Inclusive and Exclusive)

Two policies, namely, an inclusive policy and an exclusive policy are considered as a policy for the case where word data is stored in the L2 data array 11 and line data is stored in the L3 data array 14, where both of the data arrays function as the hybrid memory during the second mode. The inclusive policy duplicates the word data stored in the L2 data array 11 to store to the L3 data array 14 as well. The exclusive policy does not duplicate the word data stored in the L2 data array 11 to store to the L3 data array 14.

Figure 8:
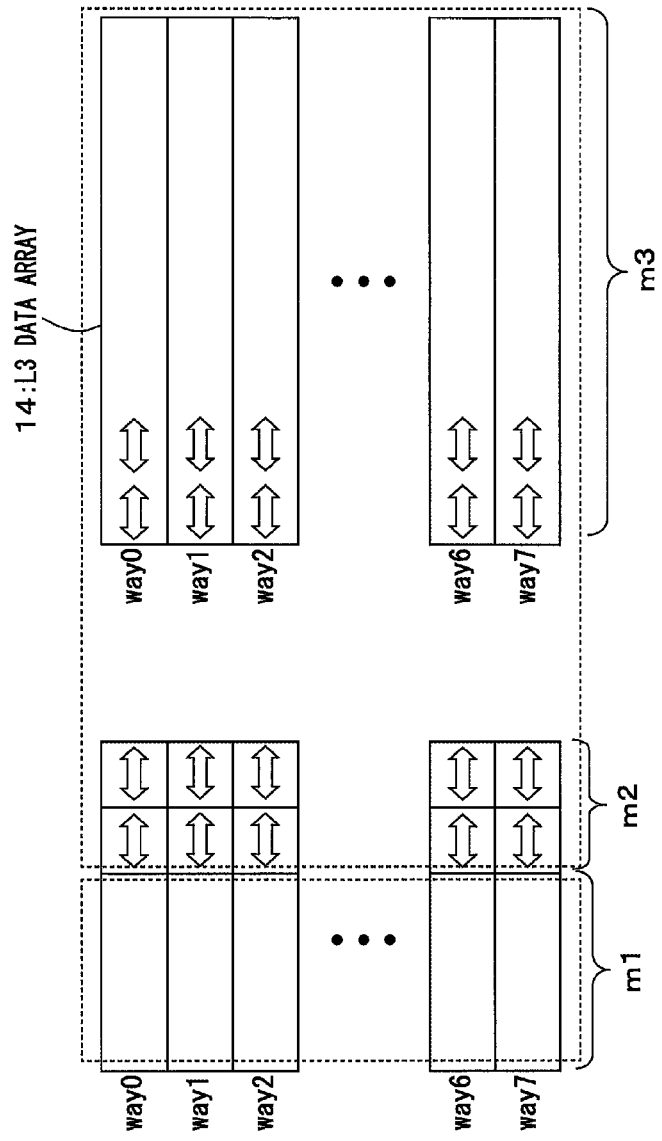
FIG. 8 is a diagram for explaining an inclusive policy.

FIG. 8 is a diagram for explaining the inclusive policy (first policy). FIG. 8 indicates an example using a hybrid memory having a data structure similar to that in FIG. 5. Note that FIGS. 9 and 10 described later also use hybrid memories having data structures similar to that in FIG. 5. According to the inclusive policy, part of the word data inside cache line data stored to the L3 data array 14 in units of cache lines is duplicated to be stored to the memory region m2 configured by the L2 data array 11. Once the L3 controller 17 learns, from tag information within the L3 tag array 16, that desired word data to be accessed is stored in the memory region m2, the L3 controller 17 accesses the L3 data array 14 while accessing the word data within the memory region m2 at the same time.

The memory region m4 is omitted in FIG. 8. However, the memory region m4 may be provided as in FIG. 5 to store the identification information of each word data stored in the memory region m2. Although the memory region m4 is also omitted in FIGS. 9 and 10 described later, the memory region m4 may be provided therein.

Figure 9:
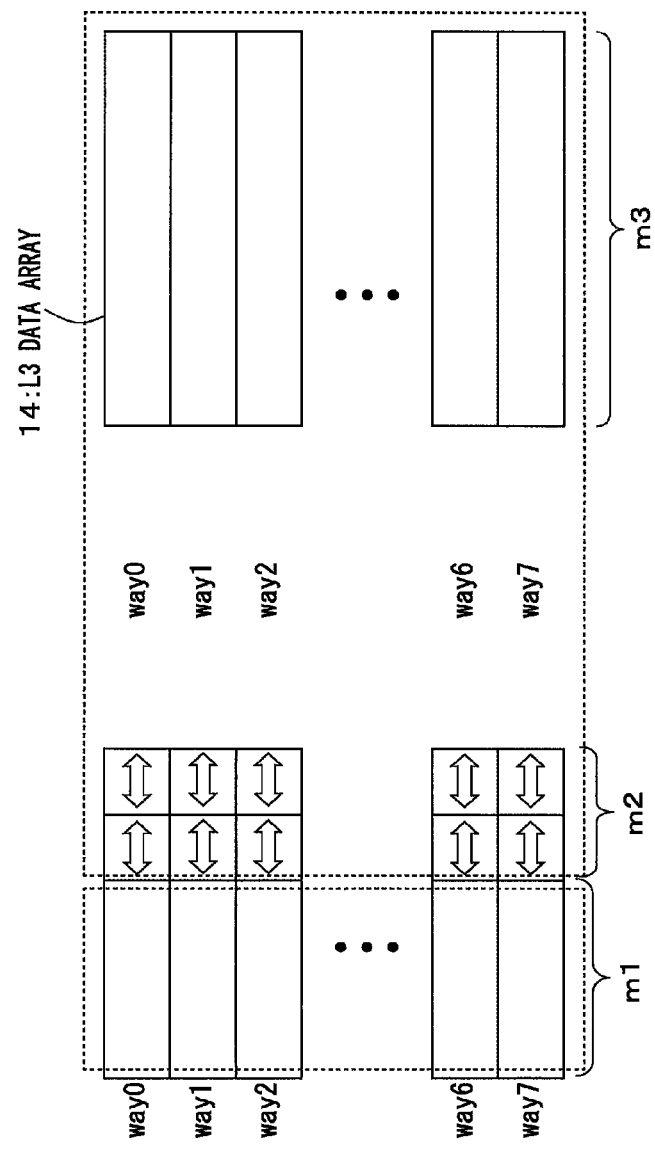
FIG. 9 is a diagram for explaining an exclusive policy.

FIG. 9 is a diagram for explaining the exclusive policy (second policy). According to the exclusive policy, after part of the word data inside cache line data stored to the L3 data array 14 in units of cache lines is stored to the memory region m2 configured by the L2 data array 11, this word data is deleted from the L3 data array 14 such that data is exclusively stored to the L3 data array 14 and the L2 data array 11. With this, the memory region within the L3 data array 14 can be effectively utilized.

In a case where the L3 data array 14 is divided into the plurality of ways, a method for storing the identical number of pieces of word data to each way of the memory region m2 configured by the L2 data array 11 may be employed in both of the inclusive policy in FIG. 8 and the exclusive policy in FIG. 9. In contrast to this, a method for giving priority to the respective ways depending on the access frequencies to store a larger number of pieces of word data to the memory region m2 configured by the L2 data array 11 in descending order of the priority may be employed (hereinafter, referred to as access frequency-based variable number-of-words method).

(Access Frequency-based Variable Number-of-words Method)

Figure 10:
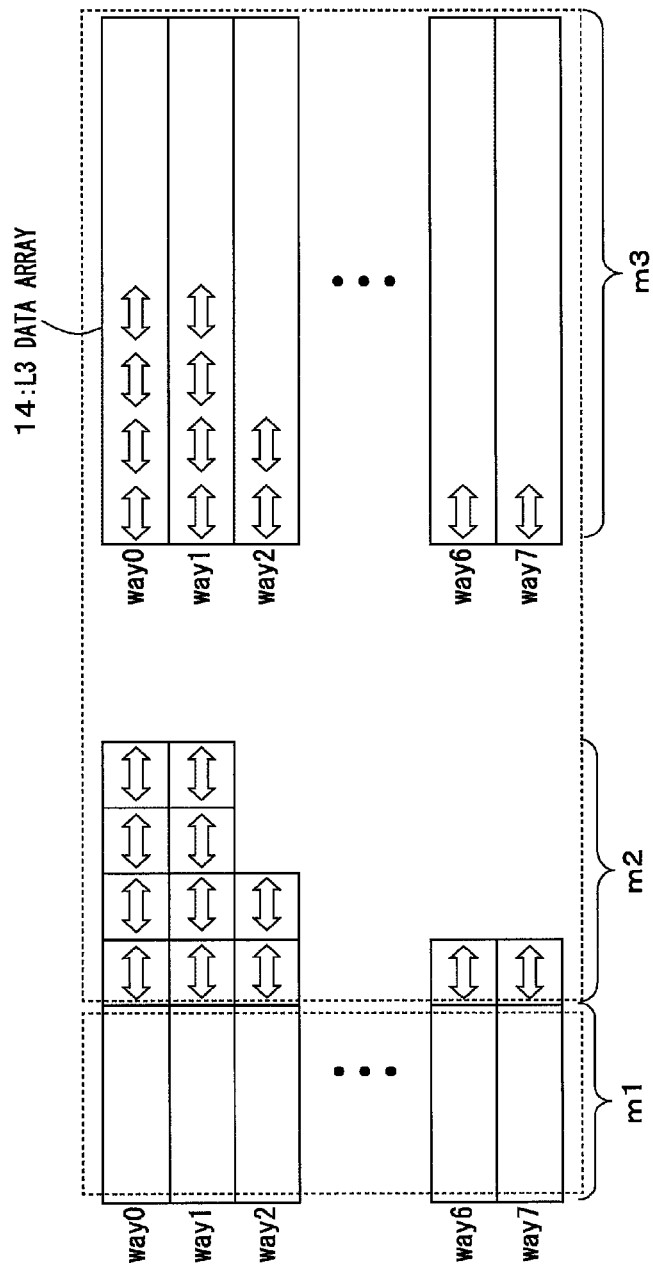
FIG. 10 is a diagram for explaining an access frequency-based variable number-of-words method for the hybrid memory in FIG. 5.

FIG. 10 is a diagram for explaining an access frequency-based variable number-of-words method for the hybrid memory in FIG. 5. The L3 controller 17 manages locality of time in access as a least recently used (LRU) position. By using this LRU position, the number of pieces of word data stored to the memory region m2 may be made variable for each of the way within the L3 data array 14. In the example in FIG. 10, each of the way 0 and the way 1 stores four pieces of word data, the way 2 stores two pieces of word data, and each of the way 6 and the way 7 stores one piece of word data in the memory region m2 within the L2 data array 11.

In the access frequency-based variable number-of-words method in FIG. 10, the following two aspects are taken into consideration when the priority is given to the respective ways.

1. When typical locality of time exists in a program executed by the arithmetic core 3, the possibility of being referred to is higher in the way 1 than the way 7.

2. Because prediction is used to identify important word data, namely, the critical word, a prediction error occurs in some cases. Accordingly, further enhancement of prediction accuracy can be expected when a larger number of words are held.

A configuration in FIG. 10 takes advantage of the characteristic described in 1 above to successfully achieve the effect according to 2 described above. Taking 1 and 2 described above into consideration, a way assigned with a smaller number stores a larger number of pieces of word data in the memory region m2 configured by the L2 data array 11 in FIG. 10.

As a method for identifying the critical word, for example, the following three methods, namely, first to third methods are considered.

The first method uses an order of addresses. An address located closer to a top side inside a cache line is more likely to be referred to first by the arithmetic core 3. For this reason, in the first method, the word data on the top side of the cache line is stored to the memory region m2 configured by the L2 data array 11 for each of the ways of the L3 data array 14. It is easy in this first method to determine the word data to be stored to the memory region m2. Accordingly, the L3 controller 17 simply stores a predetermined number of words of word data to the memory region m2 in the order from a top address in each of the cache lines. When the first method is used, it is not necessary to dynamically determine the critical word as in FIG. 4 and thus the memory region m3 configured by the L3 data array 14 does not need to be maintained.

The second method precedes the word data that has been referred to the last time. The L3 controller 17 uses the locality of time in word data stored in the L3 data array 14 to store the word data to the memory region m2 in the order from the one that has been accessed most recently. In order to realize this, a word to be stored to the memory region m2 may be determined using, for example, an LRU technique.

The third method precedes the word data with a larger number of times of being referred to. The third method takes advantage of a characteristic where the word data that has been referred to a larger number of times is more likely to be referred to. The L3 controller 17 measures the number of times of being referred to for each word data to store the word data to the memory region m2 in the order from the one with a largest number of times of being referred to.

There are various types of read requests to the L3 controller 17. The representative examples include a request using a line address capable of uniquely identifying the line data and a request using a word address capable of uniquely identifying the word data. For example, it is simple to use one of the first method, the second method, and the third method for access using the word address and use the first method for access using the line address.

Note that the L1 cache 4 acts as a requester of reading and writing in the embodiment. The L3 controller 17 sequentially transfers the read data to the L1 cache 4 acting as the requester of reading. In a case where the data transmitted from the L2 cache includes data for which the arithmetic core 3 issues the read request, the L1 cache 4 transmits the applicable data to the arithmetic core 3. For example, in a case where a critical word that has been stored to the L2 data array 11 is the data for which the arithmetic core 3 issues the read request in the second mode, this data that has arrived first is transmitted to the arithmetic core. Thereafter, when data read from the L3 data array 14 arrives, this data is stored to the L1 cache 4.

(Procedure for Reading from Hybrid Memory)

Next, a procedure for reading from the hybrid memory while the second mode is being selected will be described. Typically, the following two procedures are used as procedures for tag access and data access in an L2 cache 7. One is a parallel access method where the tag access and the data access are performed in parallel. Another is a sequential access method where the tag access and the data access are performed in sequence.

In addition to these two access methods, the embodiment provides an option of whether to execute access to the memory region m2 configured by the L2 data array 11 and access to the L3 data array 14 in parallel or in sequence. Accordingly, as combinations thereof, the reading procedure according to the embodiment has, for example, the following three methods.

1. A method that accesses the memory region m4 configured by the second L2 tag array 15, the memory region m2 configured by the L2 data array 11, the memory region m3 configured by the L3 data array 14, and the memory region m1 configured by the L3 tag array 16 in parallel.

2. A method that accesses the memory region m1 configured by the L3 tag array 16 and the memory region m4 configured by the second L2 tag array 15, subsequently accesses the memory region m2 configured by the L2 data array 11, and thereafter accesses the memory region m3 configured by the L3data array 14. In this method, the memory region m1 configured by the L3 tag array 16 and the memory region m4 configured by the second L2 tag array 15 are accessed first. In a case where it is found as a result that the word data is present in the memory region m2 configured by the L2 data array 11, the memory region m2 is accessed as a subsequent step while the memory region m3 configured by the L3 data array 14 is accessed. The data in the L2 data array 11 which can be read at a high speed is preceded so as to be transferred to a reading caller, and subsequently, the data in the L3 data array 14 is transferred. On the other hand, in a case where it is found that the word data is not present in the memory region m2 but is present in the memory region m3 configured by the L3 data array 14, the L3 data array 14 is accessed.

3. A method that accesses the memory region m1 configured by the L3 tag array 16, the memory region m4 configured by the second L2 tag array 15, and the memory region m2 configured by the L2 data array 11 in parallel. In this method, the tags in the memory regions m1 and m4 and the word data in the memory region m2 are accessed in parallel and the word data is read and transferred when the word data is present. Subsequently, the memory region m3 configured by the L3 data array 14 is accessed such that the line data is transferred. When the word data is not present in the memory region m2, the L3 data array 14 is accessed in a case where it is found from the tag in the memory region m1 that the applicable data is present in the L3 data array 14.

The aforementioned reading procedure indicates an example where the L3 data array 14 is accessed such that the line data is read therefrom even in a case where the word data is present in the L2 data array 11. However, such control may not be necessarily performed. For example, the L3 data array 14 may not be accessed when the reading caller requests the word data only.

(Procedure for Writing to Hybrid Memory)

Next, a procedure for writing to the hybrid memory according to the embodiment will be described.

In a case where a writing caller requests writing in units of lines and there is a hit in the L3 data array 14, the following procedure is used for writing. First, writing to the L3 data array 14 is performed. At the same time, the memory region m2 configured by the L2 data array 11 is referred to as necessary such that writing to the word data stored in the L2 data array 11 is performed.

In a case where the writing caller requests writing in units of words, or a case where a cache controller identifies an overwritten word inside a line even when writing is requested in units of lines, the following method can be also selected. In such a case, the following two methods are used as a writing method for a case where a cache hit to a tag within the memory region m4 configured by the second L2 tag array 15 is detected.

1. A method that, in a case where word data at an address to be written to is present in the memory region m2 configured by the L2 data array 11, overwrites the word data in the memory region m2 and also writes the same word data to the memory region m3 configured by the L3 data array 14.

2. A method that, in a case where word data at an address to be written to is present in the memory region m2 configured by the L2 data array 11, overwrites the word data in the memory region m2 but does not write the same word data to the memory region m3 configured by the L3 data array 14.

In the case of the method 2 described above, the latest word data is not written to the L3 data array 14. Accordingly, a dirty flag needs to be prepared for each word data within the memory region m2 such that the old word data is not written back to the cache memory or the main memory 6 at a lower layer. The dirty flag is stored in, for example, the memory region m2. Additionally, in order to write back to the cache memory or the main memory 6 at a lower layer, each dirty word data within the memory region m2 and cache line data within the L3 data array 14 need to be merged. Therefore, it is necessary at the time of writing back to check, based on the dirty flag, whether the memory region m2 has therein word data to be written back.

(LRU Replacement in Hybrid Memory)

Next, a procedure for LRU replacement in the hybrid memory will be described. In a case where the word data is copied or moved based on the LRU position to the memory region m2 configured by the L2 data array 11 from the L3 data array 14, the LRU replacement can be executed by merely updating the tag information in the memory region m1 configured by the L3 tag array 16 as long as the respective ways of the L3 data array 14 have the identical number of pieces of word data to be copied or moved. Typically, it is only required to overwrite an LRU order memory region associated with each of entries. For example, it is only required in the configuration in FIG. 5 to overwrite information associated with each of the entries such as way0 or way7.

On the other hand, as in the configuration in FIG. 10, in a case where the respective ways have the different number of pieces of word data to be copied or moved from each other, the following procedure is required in addition to usual control of the cache memory.

1. In the case of moving data from a way having a smaller number of pieces of word data to be copied or moved to a way having a larger number of pieces of word data to be copied or moved in the L3 data array 14, the number of pieces of word data that can be newly copied or moved is copied or moved to the memory region m2 configured by the L2 data array 11 from the L3 data array 14.

2. In the case of moving data from a way having a larger number of pieces of word data to be copied or moved to a way having a smaller number of pieces of word data to be copied or moved in the L3 data array 14, only the word data that is given a higher priority is copied or moved to the memory region m2 configured by the L2 data array 11 among the plurality of pieces of word data that have been copied or moved until that time point.

It is inefficient to overwrite the entire memory region m2 configured by the L2 data array 11 every time the LRU positions are replaced. For a solution to this, the word data may be updated only when word data to be stored to the memory region m2 has a difference in the number of pieces thereof. For example, in a case where, in the memory region m2 configured by the L2 data array 11, two pieces of word data are ensured in the way 1 holding data A, whereas one piece of word data is ensured in the way 7 holding data B, the following procedure can be used to replace the LRU positions between the way 1 and the way 7.

First, after the tag information is updated as in the case of a typical cache memory, a region of the memory region m2 equivalent to one piece of word data, which corresponds to the data A, is reassigned as a region equivalent to one piece of word data for the data B. Next, the one piece of word data for the data B is written to the region equivalent to one piece of the word data that has been newly assigned to the data B.

As described thus far, the embodiment makes it possible to switch between the first mode for using the L2 data array 11 configured by using the volatile memory and the L3 data array 14 configured by using the non-volatile memory as the layered cache memories and the second mode for using these data arrays as the hybrid memory in which these data arrays have different access speed from each other in the same layer. As a result, low electric power consumption can be achieved without a decrease in access performance by properly switching the modes. Specifically, based on the access frequencies of the L2 data array 11 and the L3 data array 14, the reconfiguration controller 18 that switches the modes compares the overheads in the respective modes to select a mode with a smaller overhead, whereby both of the enhancement of access speed and a decrease in the electric power consumption can be achieved at the same time. Consequently, even in the case of using, as the non-volatile memory, a memory such as the MRAM with slower access speed and a higher bit error rate than those of the SRAM, decreases in access performance and data reliability can be suppressed. In particular, when the SRAM is used as the L2 data array 11 and the MRAM is used as the L3 data array 14, data having a higher access frequency or the word data having influence on execution speed of the arithmetic core among cache line data originally to be stored to the L3 data array 14 can be stored to the SRAM in accordance with a feature of a program. As a result, a larger memory capacity and the enhancement of access performance can be realized.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory system comprising:
   a first cache memory comprising a volatile memory;
   a second cache memory comprising a non-volatile memory with access speed slower than access speed of the volatile memory; and
   a reconfiguration control circuitry to switch between a first mode that uses the second cache memory as a cache memory in a lower layer than the first cache memory and a second mode that uses the first cache memory and the second cache memory as cache memories in an identical memory layer.

2. The memory system according to claim 1, further comprising a switching information storage to store switching information on the first mode or the second mode.

3. The memory system according to claim 1, further comprising:
a first control circuitry to access the first cache memory during the first mode and to stop to access the first cache memory during the second mode; and
a second control circuitry to access the second cache memory during the first mode and to access the first and second cache memories during the second mode.

4. The memory system according to claim 3, wherein the second control circuitry accesses the second cache memory in units of data amounts larger than units used to access the first cache memory during the second mode.

5. The memory system according to claim 4, wherein the second control circuitry accesses the first cache memory in units of words and accesses the second cache memory in units of cache lines during the second mode.

6. The memory system according to claim 3, wherein the second control circuitry stores all of data stored to the first cache memory to the second cache memory during the second mode.

7. The memory system according to claim 3, wherein the second control circuitry stores data to the first cache memory and the second cache memory exclusively during the second mode.

8. The memory system according to claim 3, wherein the second control circuitry controls whether to store word data to be written, to the first cache memory, based on an access frequency by a processor during the second mode.

9. The memory system according to claim 3, wherein the first control circuitry accesses the first cache memory in units of cache lines during the first mode, whereas the second control circuitry accesses the second cache memory in units of cache lines during the first mode.

10. The memory system according to claim 3, wherein the reconfiguration control circuitry communicates switching information on the first mode or the second mode to the first control circuitry and the second control circuitry.

11. The memory system according to claim 1, wherein the first cache memory comprises:
a first cache data circuitry comprising a first part of the volatile memory; and
a first tag circuitry comprising a second part of the volatile memory and to store address information corresponding to data stored in the first cache data circuitry, and
the second cache memory comprises:
a second cache data circuitry comprising the non-volatile memory; and
a second tag circuitry comprising a volatile memory and to store address information corresponding to data stored in the second cache data circuitry.

12. The memory system according to claim 1, wherein the reconfiguration control circuitry switches between the first mode and the second mode based on at least an access frequency to the first cache memory and an access frequency to the second cache memory.

13. The memory system according to claim 1, wherein the volatile memory is a static random access memory (SRAM), whereas the non-volatile memory is a magnetoresistive random access memory (MRAM).

14. A memory system comprising:
a first cache memory comprising a volatile memory that does not require error correction processing during reading;
a second cache memory comprising a non-volatile memory with access speed slower than access speed of the volatile memory, the non-volatile memory requiring error correction processing during reading;
a reconfiguration control circuitry to switch between a first mode that uses the second cache memory as a cache memory in a lower layer than the first cache memory and a second mode that uses the first cache memory and the second cache memory as cache memories in an identical memory layer; and
an error correction circuitry to carry out the error correction processing on data read from the second cache memory.

15. The memory system according to claim 14, further comprising:
a first control circuitry to access the first cache memory during the first mode and to stop to access the first cache memory during the second mode; and
a second control circuitry to access the second cache memory during the first mode and to access the first and second cache memories during the second mode.

16. The memory system according to claim 15, wherein the second control circuitry accesses the second cache memory in units of data amounts larger than units used to access the first cache memory during the second mode.

17. The memory system according to claim 15, wherein the second control circuitry stores all of data stored to the first cache memory to the second cache memory during the second mode.

18. The memory system according to claim 14, wherein the first cache memory comprises:
a first cache data circuitry comprising a first part of the volatile memory; and
a first tag circuitry comprising a second part of the volatile memory and to store address information corresponding to data stored in the first cache data circuitry, and
the second cache memory comprises:
a second cache data circuitry comprising the non-volatile memory; and
a second tag circuitry comprising a volatile memory and to store address information corresponding to data stored in the second cache data circuitry.

19. The memory system according to claim 14, wherein the reconfiguration control circuitry switches between the first mode and the second mode based on at least an access frequency to the first cache memory and an access frequency to the second cache memory.

20. The memory system according to claim 14, wherein the volatile memory is a static random access memory (SRAM), whereas the non-volatile memory is a magnetoresistive random access memory (MRAM).

* * * * *